(12) United States Patent
Sato et al.

(10) Patent No.: US 11,483,725 B2
(45) Date of Patent: Oct. 25, 2022

(54) MOBILE TERMINAL TEST DEVICE AND MOBILE TERMINAL TEST METHOD

(71) Applicant: ANRITSU CORPORATION, Atsugi (JP)

(72) Inventors: Tsuyoshi Sato, Atsugi (JP); Takuma Goto, Atsugi (JP); Shunsuke Chino, Atsugi (JP); Ryoji Yamamoto, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 18 days.

(21) Appl. No.: 17/223,320

(22) Filed: Apr. 6, 2021

(65) Prior Publication Data

US 2021/0337405 A1 Oct. 28, 2021

(30) Foreign Application Priority Data

Apr. 27, 2020 (JP) .............................. JP2020-078233

(51) Int. Cl.
- *H04W 24/00* (2009.01)
- *H04W 24/06* (2009.01)
- *H04W 8/24* (2009.01)

(52) U.S. Cl.
CPC ............. *H04W 24/06* (2013.01); *H04W 8/24* (2013.01)

(58) Field of Classification Search
CPC ........ H04W 24/06; H04W 8/24; H04W 88/08
See application file for complete search history.

(56) References Cited

U.S. PATENT DOCUMENTS

| | | | | |
|---|---|---|---|---|
| 9,787,534 B1 * | 10/2017 | Kadosh | ................... | H04L 43/50 |
| 2014/0134998 A1 * | 5/2014 | Wang | ..................... | H04B 17/29 455/425 |
| 2015/0382212 A1 * | 12/2015 | Elliott | ................. | H04L 61/5007 370/252 |

FOREIGN PATENT DOCUMENTS

JP 6505790 B2 4/2019

* cited by examiner

*Primary Examiner* — Hashim S Bhatti
(74) *Attorney, Agent, or Firm* — Greer Burns & Crain Ltd.

(57) ABSTRACT

Provided is a mobile terminal test device that tests a mobile communication terminal by simulating a mobile communication base station, the mobile terminal test device including: an acquisition unit that acquires terminal capability information, which is information related to a capability of the mobile communication terminal, by communicating with the mobile communication terminal; a generation unit that generates a test case as a combination of parameter setting values set in test parameters based on the terminal capability information; an execution unit that sequentially executes the test cases; an identification unit that identifies a parameter condition in which an error occurs, from a set of test cases in which the error occurred among the executed test cases; and a management unit that excludes unexecuted test cases that meet the identified parameter condition from subsequent execution targets.

11 Claims, 5 Drawing Sheets

FIG.2

| Result | Case ID | NR | | | | E-UTRA | | | | BCS | Total bandwidth | Bands | MIMO | | Carrier (NR) | | Carrier (LTE) | | | | |
|---|---|---|---|---|---|---|---|---|---|---|---|---|---|---|---|---|---|---|---|---|---|
| | | Number of CCs | | Number of bands | | Number of CCs | | Number of bands | | | | | | | 1 | 2 | 1 | 2 | 3 | 4 | 5 |
| | | DL | UL | CA Configuration | DL UL | DL | UL | CA Configuration | DL UL | | | | DL | UL | 10/15/20/40/ 50/60/80/100 | 10/15/20/40/ 50/60/80/100 | 1.4/3/5/ 10/15/20 | 1.4/3/5/ 10/15/20 | 1.4/3/5/ 10/15/20 | 1.4/3/5/ 10/15/20 | 1.4/3/5/ 10/15/20 |
| ☒ | | 2 | 1 | n77C n77A | 1 1 | 4 | 1 | A–3A– 19A–21 | 4 1 | 1 | 280 | 1 | 2x2 | 2x2 | | | 20 | | | | |
| | | | | | | | | | | | | 3 | 2x2 | – | | | 20 | | | | |
| | | | | | | | | | | | | 19 | 4x4 | – | | | 20 | | | | |
| | | | | | | | | | | | | 21 | 4x4 | – | | | 20 | | | | |
| | | | | | | | | | | | | n77 | 4x4 | 2x2 | 100 | 100 | | | | | |

MOBILE TERMINAL TEST DEVICE AND MOBILE TERMINAL TEST METHOD

CROSS-REFERENCE TO RELATED APPLICATIONS

This application claims Convention priority to Japanese Patent Application No. 2020-078233, filed Apr. 27, 2020, the entire contents of which are incorporated herein by reference.

FIELD OF THE INVENTION

The present invention relates to a mobile terminal test device to test a mobile communication terminal and a mobile terminal test method.

BACKGROUND ART

When a mobile communication terminal such as a mobile phone, a data communication terminal, or an in-vehicle communication terminal is developed, it is necessary to test whether or not the developed mobile communication terminal can communicate normally. Therefore, such a test is performed in which a mobile communication terminal to be tested is connected to a test device that operates as a pseudo base station that imitates the function of an actual base station, and communication is performed between the test device and the mobile communication terminal, and confirm the content of the communication.

In addition, in the 3GPP (3rd Generation Partnership Project), which establishes communication standards for wireless communication, carrier aggregation (Carrier Aggregation) technology and MIMO (Multiple-Input and Multiple-Output) technology and the like are introduced among the communication standards of LTE (Long Term Evolution) and 5G NR (New Radio). For example, this carrier aggregation aims to improve the transmission speed by simultaneously using a plurality of carriers of LTE and 5G for communication.

In carrier aggregation, communication is performed using a plurality of LTE and 5G NR carriers called component carriers (hereinafter, also referred to as CC). In carrier aggregation, communication is performed by one primary component carrier, which is the CC required for the mobile communication terminal to maintain the connection with the base station, and one or more secondary component carriers that are CCs used to improve the transmission speed between the mobile communication terminal and the base station.

Patent Document 1 disclose a mobile terminal test device that obtains UE EUTRA Capability from the mobile communication terminal and carries out all the test patterns that the mobile communication terminal can carry out, when testing a mobile communication terminal compatible with LTE.

CITATION LIST

Patent Literature

Patent Document 1: Japanese Patent No. 65505790

SUMMARY OF THE INVENTION

Technical Problem

With the sophistication of LTE and 5G NR, parameters (also called test parameters) such as frequency band, bandwidth, CC number, and MIMO order supported by mobile communication terminals are steadily increasing, so that the number of the operation patterns combining these parameters reaches tens of thousands of ways.

When testing a mobile communication terminal, the user needs to prepare in advance a "test case" that is a combination of test parameter setting values (also called parameter setting values). As the number of test parameters increases, the number of test cases to be prepared as well as the operation pattern has increased dramatically.

In addition, there are multiple types of tests such as throughput test and cell mobility test, and the user needs to prepare test cases based on the configuration of various test parameters according to the type of test.

Furthermore, there are two types of 5G NR operation modes: non-standalone (NSA) mode and standalone (SA) mode. The NSA mode is an operation mode in which a 5G NR wireless communication method and an LTE/LTE-A (Long Term Evolution-Advanced) communication method are used in combination. The SA mode is an operation mode in which 5G NR alone performs control from control between a base station and a mobile communication terminal to data transmission/reception. The configuration of test parameters changes according to the difference in operation mode, which also contributes to the increase in the number of test cases.

In such a situation where test parameters increase including the operation form and test type, it is necessary to comprehensively test and evaluate all patterns of combinations of these test parameters from the viewpoint of software integration and software regression, thus obliging the users to spent a great deal of effort and a great deal of cost for performing all the test cases.

The present invention has been made to solve such a conventional problem, and it is the object of the present invention to provide a mobile terminal test device and a mobile terminal test method capable of performing the test efficiently at low cost even in a test of a mobile communication terminal supporting 5G NR, which has a huge number of test cases.

Means to Solve Problems

In order to solve the above problems, the mobile terminal test device according to the present invention is a mobile terminal test device (1) that tests a mobile communication terminal (2) by simulating a mobile communication base station, the mobile terminal test device comprising: an acquisition unit (141) that acquires terminal capability information, which is information related to a capability of the mobile communication terminal, by communicating with the mobile communication terminal; a generation unit (144) that generates a test case as a combination of parameter setting values set in test parameters based on the terminal capability information; an execution unit (132) that sequentially executes the test cases; an identification unit (136) that identifies a parameter condition in which an error occurs, from a set of test cases in which the error occurred among the executed test cases; and a management unit (134) that excludes unexecuted test cases that meet the identified parameter condition from subsequent execution targets.

As described above, in the mobile terminal test device according to the present invention, the identification unit identifies the parameter condition in which the error occurs from the set of the test cases in which the error occurred among the executed test cases, and the management unit determines the parameter condition in which the error occurs, and the management unit excludes unexecuted test cases that meet the specified parameter condition are excluded from the subsequent execution targets. By this configuration, it is possible to avoid the execution of test cases in which errors are expected to occur during the test, thereby making it possible to execute test cases efficiently and at low cost, even if the test includes a huge number of test cases, for example, a test of a mobile communication terminal supporting 5G NR.

Further, in the mobile terminal test device of the present invention, the identification unit may be provided with a determination unit (1361) that determines whether or not the error has occurred, based on a reception level or a transmission level of the mobile communication terminal at the time of executing the test case.

By this configuration, the mobile terminal test device according to the present invention can reliably determine the communication error of the test case, in addition to the success/failure of the test case.

Further, in the mobile terminal test device of the present invention, the identification unit may be further provided with a search unit (1363) that searches a common parameter setting value from a set of test cases in which the error has occurred, as the parameter condition.

By this configuration, the mobile terminal test device according to the present invention can quickly and surely acquire the parameter condition in which a communication error occurs.

Further, the mobile terminal test device of the present invention may be further provided with an extraction unit (142) that extracts a first capability information related to a first wireless communication method from the terminal capability information, wherein the generation unit generates a test case as a combination of parameter setting values set in the test parameters in the first wireless communication method based on the first capability information.

By this configuration, the mobile terminal test device according to the present invention can reliably and easily generate all test cases without omission for various tests, even in an operation mode (stand-alone) in which control and data transmission/reception between the base station and the mobile communication terminal are performed by the first wireless communication method alone.

Further, in the mobile terminal test device of the present invention, the extraction unit may further extract a second capability information related to a second wireless communication method from the terminal capability information, and the generation unit may further generate a test case as a combination with the combination of parameter setting values set in the test parameters in the second wireless communication method, based on a combination of the parameter setting values set in the test parameters in the first wireless communication method and the second capability information.

By this configuration, the mobile terminal test device according to the present invention can reliably and easily generate all test cases without omission for various tests in an operation mode (non-standalone) in which the first wireless communication method and the second wireless communication method are used in combination.

In addition, the mobile terminal test device of the present invention may be further provided with a list generation unit (145) that generates a list of execution order of the test cases generated by the generation unit, and a display unit (12) that displays the list together with execution results of the test cases and presence/absence of execution exclusion.

By this configuration, the mobile terminal test device according to the present invention allows a user to easily confirm the generated test cases and the execution result, on the order of execution, including presence/absence of the execution exclusion.

Further, in the mobile terminal test device of the present invention, the first wireless communication method may be a 5G NR (New Radio) communication method, and the second wireless communication method may be an LTE (Long Term Evolution) or LTE-A (Long Term Evolution Advanced) communication method.

By this configuration, the mobile terminal test device according to the present invention can execute various tests effectively and at low cost in an operation mode (non-standalone) in which a 5G NR communication method and an LTE communication method are used in combination.

Further, the mobile terminal test method of the present invention is a mobile terminal test method that tests a mobile communication terminal (2) by simulating a mobile communication base station, the method comprising: an acquisition step to acquire a terminal capability information, which is information related to a capability of the mobile communication terminal, by communicating with the mobile communication terminal; a generation step to generate a test case as a combination of parameter setting values set in test parameters based on the terminal capability information; an execution step to sequentially execute the test cases; an identification step to identify a parameter condition in which an error occurs, from a set of test cases in which the error occurred among the executed test cases; and a management step to exclude unexecuted test cases that meet the identified parameter condition from subsequent execution targets.

As described above, in the mobile terminal test method according to the present invention, the parameter condition in which the error occurs is identified from the set of test cases in which the error occurs among the executed test cases in the identification step, and unexecuted test cases that meet the specified parameter conditions are excluded from the subsequent execution targets in the management step. By this configuration, it is possible to avoid the execution of test cases in which errors are expected to occur during the test, thereby making it possible to execute test cases efficiently and at low cost, even if the test includes a huge number of test cases, for example, a test of a mobile communication terminal supporting 5G NR.

Effect of the Invention

According to the present invention, it is possible to provide a mobile terminal test device and a mobile terminal test method capable of performing the test efficiently at low cost even in a test of a mobile communication terminal supporting 5G NR, which has a huge number of test cases.

BRIEF DESCRIPTION OF DRAWINGS

FIG. 2 is a figure showing parameters in the test by the mobile terminal test device according to the embodiment of the present invention. It is a figure which shows an example of the combination of setting values (test case).

DETAILED DESCRIPTION OF EMBODIMENTS

Hereinafter, the mobile terminal test device according to the embodiment of the present invention will be described in detail with reference to the drawings.

Figure 1:
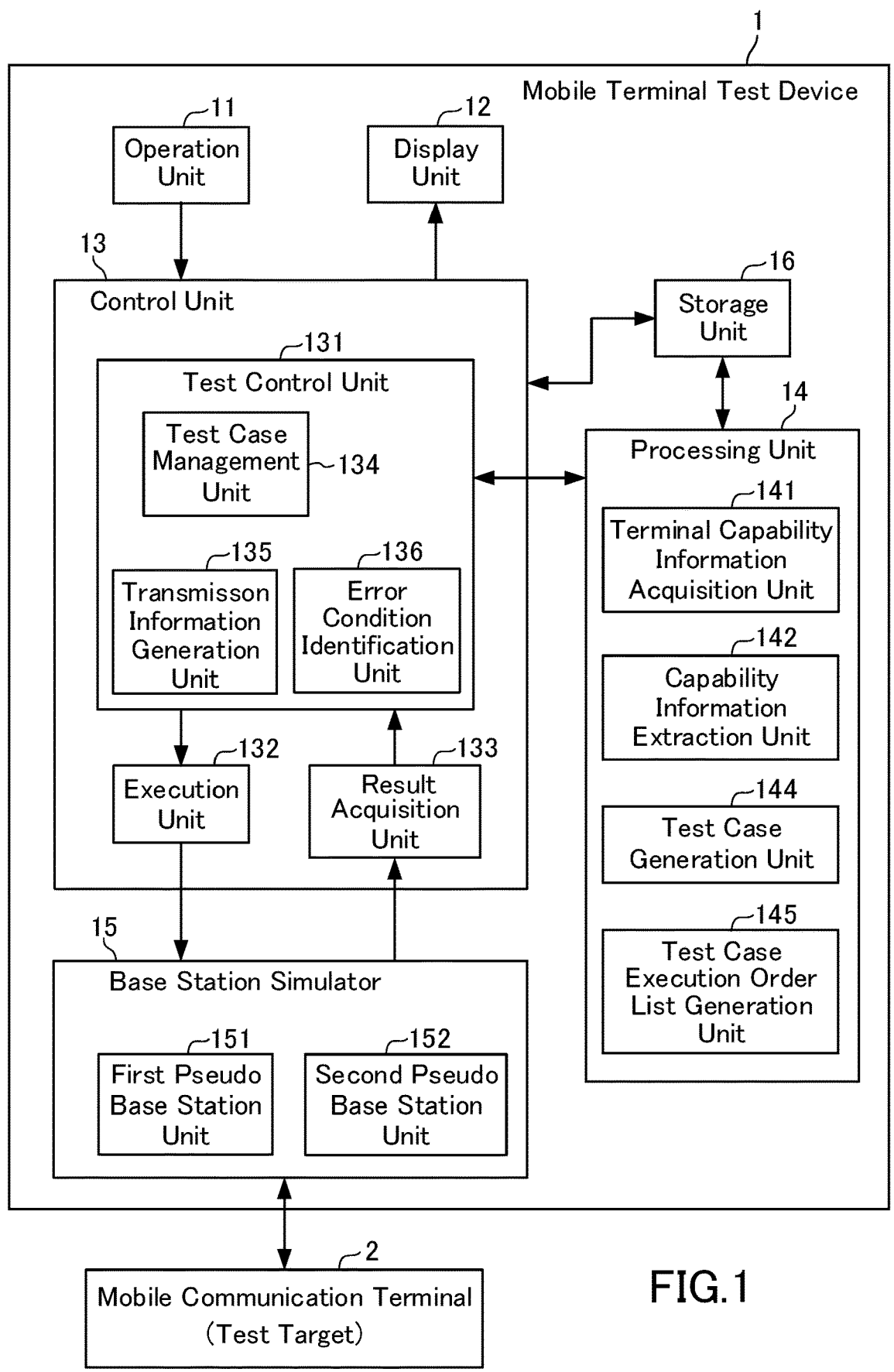
FIG. 1 is a block diagram showing a configuration of a mobile terminal test device according to an embodiment of the present invention.

FIG. 1 is a block diagram showing the configuration of the mobile terminal test device 1 according to the present embodiment. The mobile terminal test device 1 tests the mobile communication terminal 2 by simulating a mobile communication base station according to a test case. As shown in FIG. 1, the mobile terminal test device 1 is provided with an operation unit 11, a display unit 12, a control unit 13, a processing unit 14, a base station simulator 15, and a storage unit 16. Hereinafter, each component will be described.

The operation unit 11 is provided with an input device such as a keyboard, a mouse, and a touch panel, and outputs, for example, instruction information to the mobile terminal test device 1 that is operated and inputted by the user to the control unit 13. For example, the user may operate the operation unit 11 to select the type of test to be performed (throughput test, cell mobility test, and the like).

The display unit 12 is provided with an image display device such as a liquid crystal display, and displays a list of test case execution order (test case execution order list) together with test case execution results and the presence or absence of execution exclusion. To be specific, the display unit 12 displays, for example, information on whether or not execution is excluded for each test case, which is determined based on the error condition identified by the error condition identification unit 136, which will be described later. In addition, the display unit 12 also displays various states during the test.

The control unit 13 manages and executes test cases, evaluates execution results, and the like, and is provided with a test control unit 131, an execution unit 132, and a result acquisition unit 133.

The test control unit 131 controls the execution of test cases based on the test cases generated by the processing unit 14 and the list of execution order thereof (test case execution order list), evaluates the execution results of the test cases, and executes an error processing. Evaluation is conducted based on evaluation criteria established for each test case, each group of test cases, or each test. The test control unit 131 is provided with a test case management unit 134, a transmission information generation unit 135, and an error condition identification unit 136.

The test case management unit 134 manages the test case execution order, execution presence/absence, execution result, execution exclusion, and the like. For example, as an execution exclusion management process, the test case management unit 134 excludes unexecuted test cases that meet the parameter conditions identified by the error condition identification unit 136 from the subsequent execution targets. In other words, the test case management unit 134 narrows down the test execution targets in consideration of the error factors identified by the error condition identification unit 136 during the execution of the test.

The transmission information generation unit 135 is adapted to generate transmission information to be transmitted from the first pseudo base station unit 151 and the second pseudo base station unit 152 through the execution unit 132 based on the information of the test case. Specifically, the transmission information generation unit 135 generates notification information of the first pseudo base station unit 151 and the second pseudo base station unit 152, transmission information in the location registration process, and the like based on the information of the test case. For example, the transmission information generation unit 135 generates broadcast information based on individually set base station operation setting information simulated by each of the first pseudo base station unit 151 and the second pseudo base station unit 152.

The error condition identification unit 136 estimates and identifies the parameter condition in which the error occurs from the set of the test cases in which the error occurred among the executed test cases, as will be described in detail later.

The execution unit 132 executes test cases sequentially. To be specific, the execution unit 132 executes the test by transmitting information and settings to the base station simulator 15 based on the information (scenario) of the test cases and the test case execution order list stored in the storage unit 16 under the control of the test control unit 131. Tests have come to be carried out by sending instruction information such as information, for example, having notification information transmitted to the mobile communication terminal 2, or having a communication sequence between the base station simulator 15 and the mobile communication terminal 2 executed.

The result acquisition unit 133 acquires information on the result of the communication between the base station simulator 15 and the mobile communication terminal 2 from the base station simulator 15 and transmits the information to the test control unit 131.

The base station simulator 15 receives an instruction from the execution unit 132 and performs communication with the mobile communication terminal 2 by simulating the base station, and is provided with the first pseudo base station unit 151 and the second pseudo base station unit 152. The first pseudo base station unit 151 and the second pseudo base station unit 152 are designed to simulate a base station that operates according to a 5G NR communication standard or a 4G (LTE or LTE-A) communication standard. Hereinafter, "5G NR" may be simply referred to as NR, and "LTE or LTE-A" will be simply referred to as LTE. The base station simulator 15 of the present embodiment has two pseudo base station units, but may be one or three or more depending on the content of the test.

The signals transmitted by the first pseudo base station unit 151 and the second pseudo base station unit 152 are combined by a coupler (not shown) and transmitted to the mobile communication terminal 2. Further, the signal received from the mobile communication terminal 2 is sent to each of the first pseudo base station unit 151 and the second pseudo base station unit 152 through the coupler.

The storage unit 16 is constituted by a hard disk device, a flash memory, or the like, and stores test case information generated by the processing unit 14, test case execution order list information, test result information of each test case, the information of test cases excluded from execution, and the like.

Next, the processing unit 14 will be described.

Hereinafter, description will be made based on an assumption that the mobile communication terminal 2 is compatible with the 5G NR communication method, but the communication method is not limited to this.

As shown in FIG. 1, the processing unit 14 generates data and information required for performing a test, and is provided with a terminal capability acquisition unit 141, a capability information extraction unit 142, a test case generation unit 144, and a test case execution order list generation unit 145.

The terminal capability information acquisition unit 141 is adapted to acquire terminal capability information indicating the ability, performance, or function supported by the mobile communication terminal 2 by communicating with the mobile communication terminal 2. To be specific, the terminal capability information acquisition unit 141 acquires, for example, the UE Capability Information installed in the mobile communication terminal 2. The terminal capability information acquisition unit 141 constitutes the acquisition unit of the present invention.

The capability information extraction unit 142 extracts the first capability information related to the 5G NR communication method and the second capability information related to the LTE communication method from the terminal capability information, respectively. To be specific, the capability information extraction unit 142 extracts capability information related to setting values (parameter setting values) that can be set to test parameters such as carrier aggregation configuration, frequency band, bandwidth, and MIMO in each of 5G NR and LTE, for example from UE Capability Information. The capability information extraction unit 142 constitutes the extraction unit of the present invention.

The test case generation unit 144 generates a test case as a combination of parameter setting values set in the test parameters based on the terminal capability information. To be specific, the test case generation unit 144 is adapted to automatically generate a test case by combining a combination of parameter setting values set in the test parameters in the 5G NR communication method and a test in the LTE communication method based on the first capability information and the second capability information. The test case generation unit 144 constitutes the generation unit of the present invention.

Further, the test case generation unit 144 generates a test case as a combination of parameter setting values set in the test parameters in the 5G NR communication method based on the first capability information.

To be specific, the test case generator 144 generates a test case as a combination of parameter setting values in the 5G NR communication method, based on information on major test parameters (first capability information) such as frequency band, bandwidth, carrier aggregation configuration, and MIMO related to the 5G NR communication method. This test case can be used, for example, for a 5G NR stand-alone test.

Next, the test case will be explained.

FIG. 2 is a diagram showing an example of a test case which is a combination of parameter setting values set in the test parameters. This example is a test case for a case that the mobile communication terminal 2 supports EN-DC (LTE/NR dual connectivity) in a non-standalone system of 5G NR. This test case is constituted by a combination of a condition imposed on a cell or base station that supports 5G NR (5G NR cell condition) and a condition imposed on the cell or base station supporting LTE (LTE cell condition). The 5G NR cell condition and the LTE cell condition are respectively constituted by a combination of conditions imposed on the test parameters (for example, carrier aggregation configuration, frequency band, bandwidth, MIMO).

For example, in FIG. 2, as test parameters constituting the 5G NR cell condition, the number of CCs, the number of frequency bands, the carrier aggregation configuration, the MIMO configuration, the carrier wave, and the like are shown together with the parameter setting values. Further, as test parameters constituting the LTE cell condition, the number of CCs, the number of frequency bands, the carrier aggregation configuration, the MIMO configuration, the carrier wave, and the like are shown together with the parameter setting values. In the figure, DL (DownLink) indicates a downlink, UL (UpLink) indicates an uplink, and BCS (Bandwidth Combination Set) indicates a bandwidth combination.

The test case 240 is constituted as a combination of parameter setting values 210-1 and 210-2 that are set in the test parameters that specify the 5G NR cell conditions and a parameter setting values 220 that are set in the test parameters that specify the LTE cell conditions. In the figure, the portion indicated by reference numeral 230 is a combination of common parameter setting values related to 5G NR and LTE, but columns may be provided separately for 5G NR and for LTE. This means that the test case for the mobile communication terminal 2 supporting EN-DC can be generated as a combination of the 5G NR cell condition and the LTE cell condition.

The test case 240 is displayed on the display unit 12 together with its identification number 330, the execution schedule check box 370 indicating the presence or absence of execution exclusion, and the execution result 340 of the test case, and the data is stored in the storage unit 16.

The test case execution order list generation unit 145 generates a list of execution order of the test cases generated by the test case generation unit 144. The test case execution order list generation unit 145 constitutes the list generation unit of the present invention.

Here, the mobile terminal test device 1 is constituted by a computer device (not shown) provided with a communication module for communicating with the mobile communication terminal 2. This computer device is provided with a CPU (Central Processing Unit) (not shown), a ROM (Read Only Memory), a RAM (Random Access Memory), a hard disk device, an input/output port, and a touch panel.

A program for making the computer device function as the mobile terminal test device 1 is stored in the ROM and the hard disk device of this computer device. This means that when the CPU executes the program stored in the ROM with the RAM as the work area, the computer device functions as the mobile terminal test device 1.

Thus, in the present embodiment, the storage unit 16 is constituted by a RAM or a hard disk device, the control unit 13 and the processing unit 14 are constituted by a CPU, and the base station simulator 15 is constituted by a communication module. The base station simulator 15 may be configured as a device distinct from the computer devices constituting the control unit 13, the processing unit 14, and the like.

Next, the error handling by the test control unit 131 will be described in more detail.

Figure 3:
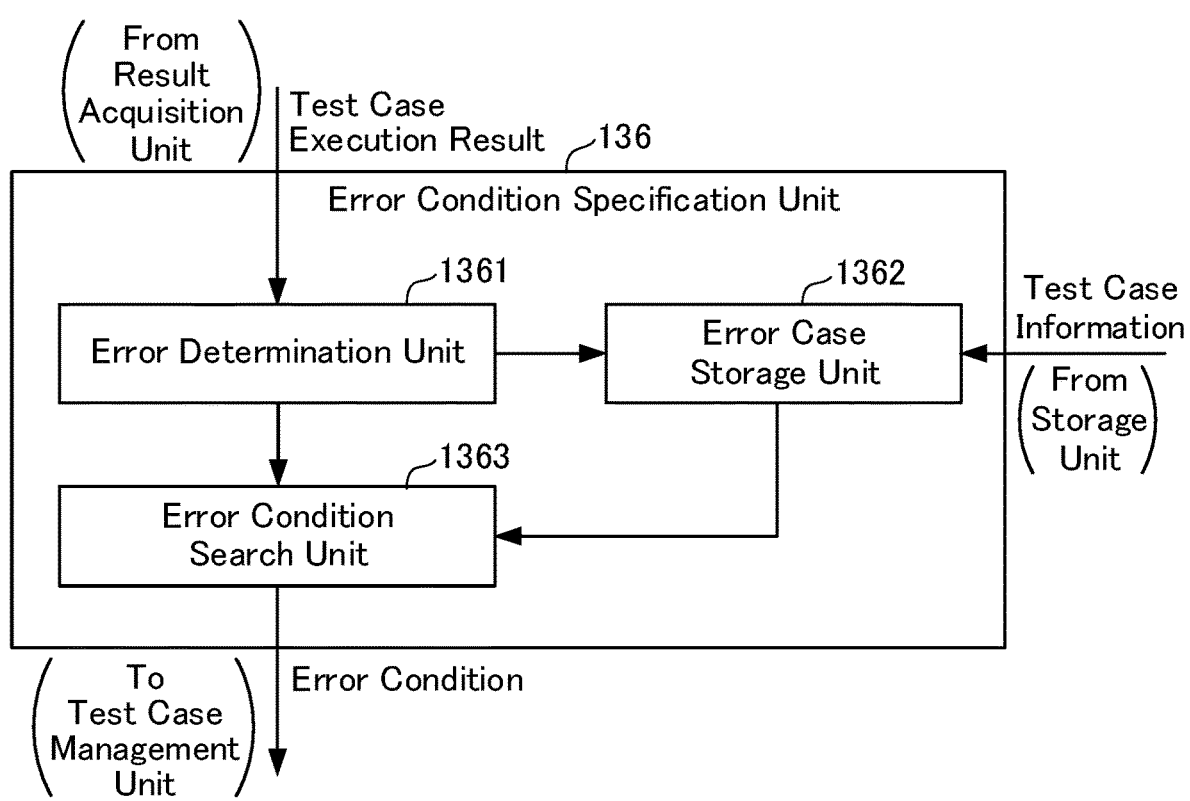
FIG. 3 is a block diagram showing a configuration of an error condition specifying unit in FIG. 1.

FIG. 3 is a block diagram showing the configuration of the error condition identification unit 136. The error condition identification unit 136 identifies the cause of the error that occurred during the execution of the test, and specifically, identifies the parameter condition that causes the error in the test case. Therefore, the error condition identification unit 136 includes an error determination unit 1361, an error condition search unit 1363, and an error case storage unit 1362.

The error determination unit 1361 determines whether or not a communication error has occurred based on the reception level at the mobile communication terminal 2 when the test case is executed. To be specific, the error determination unit 1361 determines whether or not a communication error has occurred, for example, by comparing the reception level at the mobile communication terminal 2 of the reference signal sent from the base station simulator 15 with a predetermined reference value. The error determination unit 1361 may determine whether or not an error has occurred based on the transmission level at the mobile communication terminal 2.

The information used for error determination by the error determination unit 1361 is not limited to the signal level in communication, and may be other information such as response delay time and code error rate, or may include other information. As specific causes of the error, there may be various causes such as a failure of a component such as an antenna of the mobile communication terminal 2, a software defect, and an error of the installed UE Capability. The error determination unit 1361 determines whether or not an error (also referred to as a communication error) caused by these causes on the mobile communication terminal 2 side has occurred.

The error case storage unit 1362 stores information on test cases (a set of test cases) for which the occurrence of a communication error has been confirmed by the error determination unit 1361. To be specific, the error case storage unit 1362 acquires information on the combination of the parameter setting values of the test case in which a communication error has occurred during the test from the storage unit 16, and stores the information together with the identification number of the test case. Alternatively, the error case storage unit 1362 may store only the identification number of the test case in which the communication error has occurred.

The error condition search unit 1363 searches the set of test cases in which a communication error has occurred from a collection of test cases in which a communication error has occurred stored in the error case storage unit 1362, as the parameter condition in which an error occurs.

In order to improve the search accuracy, the error condition search unit 1363 preferably does not perform the search process until the number of test cases included in the error list reaches a predetermined fixed number. Further, in order to improve the search efficiency, the error condition search unit 1363 may search for parameter setting values common to test cases occupying a predetermined ratio or more of all the test cases included in the error list.

The error condition search unit 1363 is not limited to specifying one parameter setting value common to the test cases included in the error list, and may specify a plurality of parameter setting values. For example, the error condition search unit 1363 may specify a plurality of parameter setting values of the same test parameter or parameter setting values of a plurality of test parameters as common parameter setting values by the search process.

If a specific parameter setting value is always included in the error list, the error condition search unit 1363 may deem the parameter setting value as a parameter condition in which an error occurs.

Figure 5:
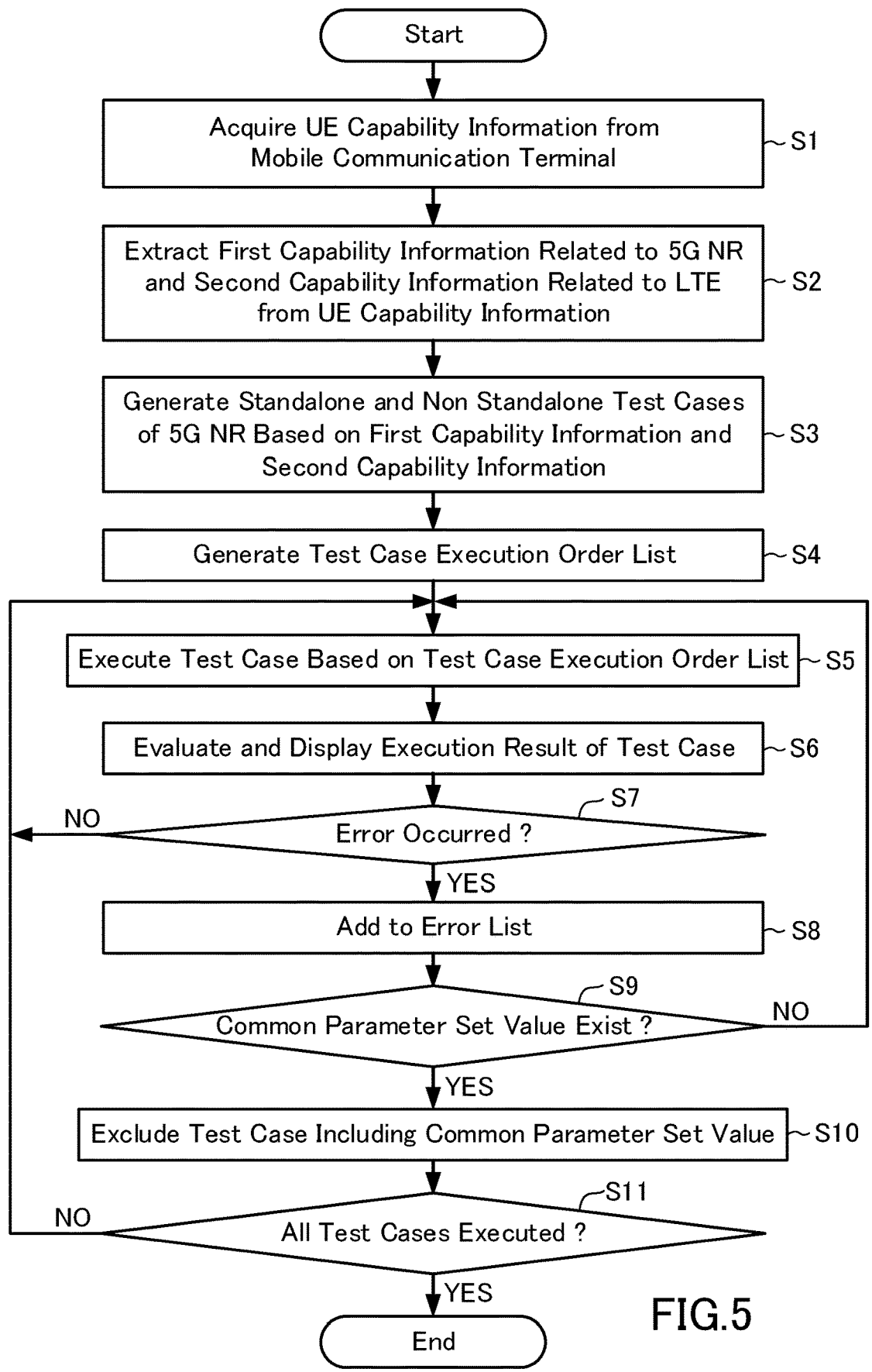
FIG. 5 is a flowchart showing a procedure of a mobile terminal test method according to an embodiment of the present invention.

Next, the mobile terminal test method will be described by taking a throughput test as an example with reference to FIG. 5. The throughput test is a communication speed test, and specifically, is a test for examining whether or not the mobile communication terminal 2 satisfies the specification value of the communication speed.

First, the user connects the mobile terminal test device 1 and the mobile communication terminal 2 by wire or wirelessly, and causes the mobile communication terminal 2 to perform location registration by turning on the power of the mobile communication terminal 2.

When the result acquisition unit 133 receives the UE Capability from the mobile communication terminal 2 through the base station simulator 15 during the location registration sequence, the result acquisition unit 133 transmits the UE Capability to the test control unit 131. It should be noted that the execution unit 132 may request the mobile communication terminal 2 to transmit UE Capability through the base station simulator 15, not only at the time of location registration, but also at the request of the test control unit 131, and the result acquisition unit 133 may transmit the EU Capability received from the mobile communication terminal 2 to the test control unit 131.

When the test control unit 131 receives the UE Capability from the result acquisition unit 133, the test control unit 131 stores the UE Capability in the storage unit 16. The terminal capability information acquisition unit 141 of the processing unit 14 acquires the UE Capability Information of the mobile communication terminal 2 from the test control unit 131 or the storage unit 16 (Step S1). The acquired UE Capability Information is stored in the RAM or the storage unit 16 of the computer device.

The UE Capability Information includes UE-NR-Capability and UE-MRDC-Capability. The UE-NR-Capability is UE Capability in 5G NR stand-alone mode. The UE-MRDC-Capability is UE Capability in 5G NR non-standalone mode, and the UE-MRDC-Capability includes a definition of the supportedBandList of the LTE carrier wave and 5G NR carrier wave. These are specified in TS 38.306, TS 38.331, and the like.

The capability information extraction unit 142 of the processing unit 14 extracts information (capability information) related to the throughput test from the UE Capability Information stored in the RAM or the storage unit 16 for each of the 5G NR and LTE (Step S2). The extracted capability information is stored in the RAM or the storage unit 16 of the computer device.

For example, the capability information extraction unit 142 obtains throughput-related capability information from UE Capability Information, which include supportedBandListEUTRA, supportedBandListNR, ca-BandwidthClassDL-EUTRA, ca-BandwidthClassUL-EUTRA, ca-BandwidthClassDL-NR, ca-BandwidthClassUL-NR, MIMO-ParametersPerBand, channelBWs-DL, and channelBWs-UL. It should be noted that similar information may be defined with a different name.

supportedBandListNR and MIMO-ParametersPerBand are information on the frequency bands supported by the mobile communication terminal 2 and information on the MIMO order of each frequency band. These are specified in TS 38.101-1, TS 38.101-2, and the like.

supportedBandListEUTRA is information on the 4G frequency band used during NSA supported by the mobile communication terminal 2. This is specified in TS 36.306 and the like.

ca-BandwidthClassDL-EUTRA, ca-BandwidthClassUL-EUTRA, ca-BandwidthClassDL-NR, and ca-BandwidthClassUL-NR are information related to combinations of frequency bands in SA mode and NSA mode supported by the mobile communication terminal 2, and bandwidth of each carrier wave. These are specified in TS 38.101-1, TS 38.101-2, and the like.

channelBWs-DL and channelBWs-UL are information on the subcarrier spacing of the carrier wave in the SA mode supported by the mobile communication terminal 2. These are specified in TS 38.101-1, TS 38.101-2, and the like.

The capability information extraction unit 142 extracts the first capability information related to the 5G NR wireless communication method and the second capability information related to the LTE wireless communication method from the UE Capability Information, respectively. To be specific, the capability information extraction unit 142 extracts information on possible parameter setting values of test parameters such as carrier aggregation, frequency band, bandwidth, and MIMO for each of the 5G NR wireless communication method and the LTE wireless communication method.

The first capability information extracted by the capability information extraction unit 142 is information on parameter setting values that can be taken when the 5G NR wireless communication method is operated standalone, and the first capability information and the second capability information are information on parameter setting values that can be taken when the 5G NR wireless communication method is operated as non-standalone.

Next, the test case generation unit 144 of the processing unit 14 generates a test case that is a combination of parameter setting values set in the test parameters related to throughput based on the capacity information extracted by the capacity information extraction unit 142. The parameter setting value refers to a set value of a test parameter (for example, frequency band, bandwidth, carrier aggregation configuration, MIMO antenna configuration, and the like) that gives test conditions (operating conditions of a cell or a pseudo base station). The generated test case is stored in the storage unit 16.

In other words, the test case generation unit 144 generates the test case for the case in which the 5G NR wireless communication method is operated as non-standalone or EN-DC (LTE/NR dual connectivity) and the test case for the case in which the 5G NR wireless communication method is operated standalone are automatically generated, based on the first capability information and the second capability information extracted in step S2.

The combination of test parameters that constitute the test case varies depending on the type of the test. For example, in the cell mobility test, the type of handover supported by the mobile communication terminal 2 and the Event that triggers the handover can also be test parameters. In addition, the combination of test parameters that constitute the test case varies depending on the operation mode of the 5G NR wireless communication method. For example, in the case of standalone, a test case is constituted by a combination of test parameters related to 5G NR, and in the case of non-standalone, the test case is constituted by the combination of test parameters related to 5G NR and a combination of test parameters related to LTE.

The type of test is selected by the user by operating the operation unit 11.

Next, the test case execution order list generation unit 145 generates a test case execution order list based on the test cases generated in step S3 (step S4). The test case execution order list is stored in the storage unit 16.

Next, the execution unit 132 executes the test cases in order according to the test case execution order list under the control of the test control unit 131 (step S5). To be specific, the execution unit 132 sets the functions of the first pseudo base station unit 151 and the second pseudo base station unit 152 of the base station simulator 15 based on each test case, and have these first and second pseudo base station units 151, 152 communicate with the mobile communication terminal 2.

The result acquisition unit 133 acquires the result of communication between the base station simulator 15 and the mobile communication terminal 2 and sends the result to the test control unit 131 (step S6). The test control unit 131 analyzes the communication result sent from the result acquisition unit 133, and evaluates the result of the throughput test based on a predetermined criteria. For example, the communication result is evaluated based on whether or not the communication speed of the mobile communication terminal 2 has reached a predetermined reference communication speed. The evaluation result is displayed on the display unit 12 and is stored in the storage unit 16.

Figure 4:
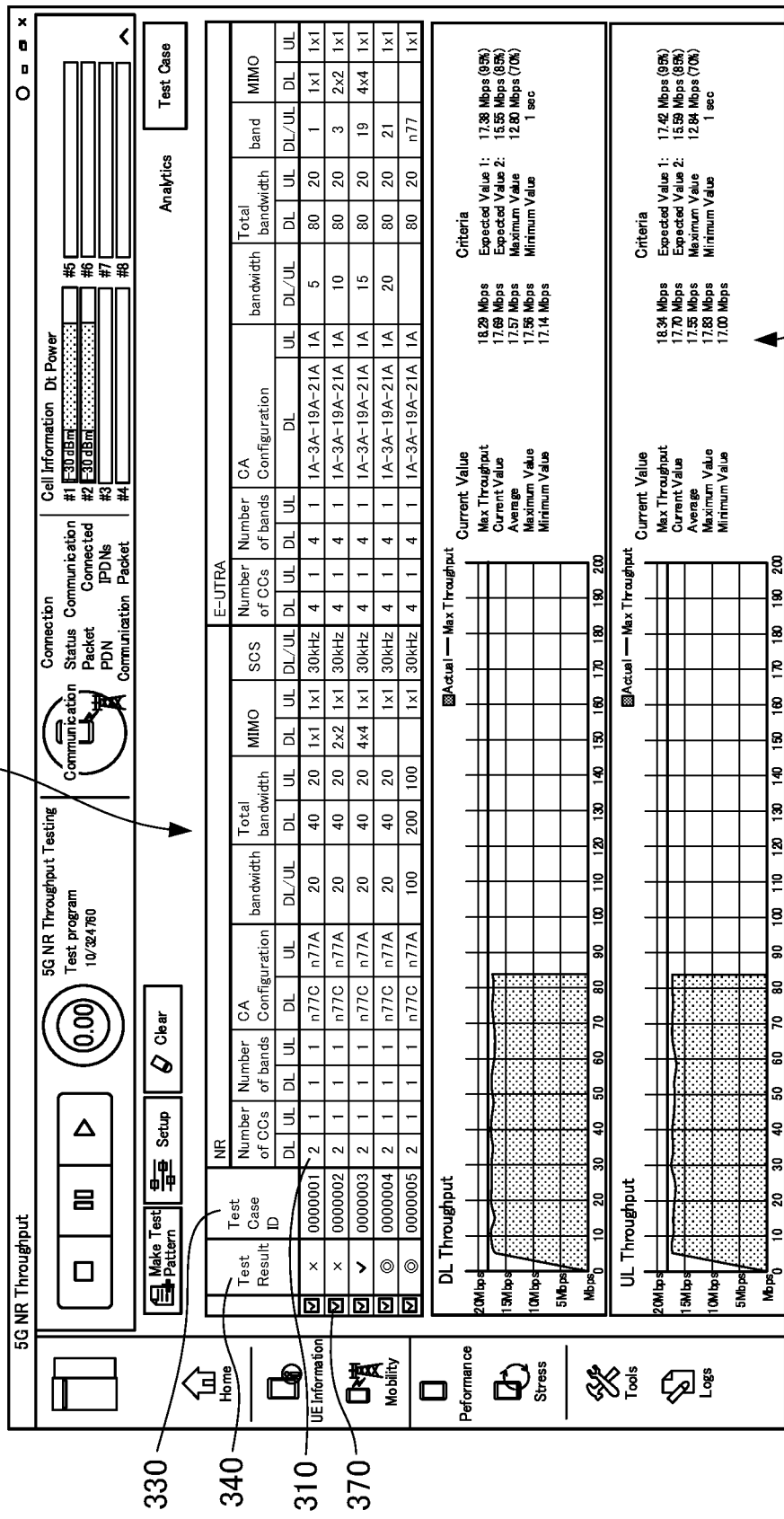
FIG. 4 is a table at the time of throughput test by the mobile terminal test device according to the embodiment of the present invention. It is a figure which shows an example of the display image of the display part.

FIG. 4 shows an example of a display image of the display unit 12 during the throughput test. As shown in FIG. 4, the display unit 12 displays the test case execution order list 320 in which the test cases 310 are arranged in the execution order, and displays the execution result 340 of each test case side by side with the test case 310 in real time. Each line in the test case execution order list 320 corresponds to one test case. An identification number 330 is assigned to each test case 310, and the identification number 330 is displayed adjacent to the test case 310. In addition, the display unit 12 also displays information such as a graph 350 of the measured throughput and a throughput evaluation 360 based on a predetermined criteria. Further, the display unit 12 displays an implementation schedule check box 370 indicating the implementation schedule of each test case, and for example, a check mark indicates whether or not the test case is implemented. For the test cases excluded from the execution target by the test case management unit 134, for example, a check mark is deleted or another mark is displayed so that the execution exclusion can be known.

The error determination unit 1361 of the error condition identification unit 136 receives the information on the execution result of the test case from the result acquisition unit 133, and determines whether or not an error such as communication error has occurred during the execution of the test case (step S7). For example, the error determination unit 1361 can determine whether or not a communication error has occurred by comparing the reception level or the transmission level of the mobile communication terminal 2 at the time of executing the test case with a predetermined reference value.

If it is not determined that a communication error has occurred (NO in step S7), the test control unit 13 returns to step S5 and continues the process.

If it is determined that a communication error has occurred (YES in step S7), the error determination unit 1361 adds the test case in which the communication error has occurred to an error list stored in the error case storage unit 1362 (step S8). The error list is a list of test cases in which the occurrence of communication errors has been confirmed (a set of test cases). To be specific, the error list includes information on the combination of the identification number of each test case in which the communication error has occurred and the parameter setting values.

When the error condition search unit 1363 receives information on the occurrence of a communication error from the error determination unit 1361, the error condition search unit 1363 searches for the parameter setting values common to each test case, from the set of test cases in which the communication error occurred stored in the error case storage unit 1362, as the parameter condition that a communication error occurs (step S9).

When there exists no parameter setting value common to the test cases included in the error list (NO in step S9), the test control unit 13 returns to step S5 and continues the process. When there exists a parameter setting value common to the test cases included in the error list (YES in step S9), the error condition search unit 1363 sends information on the common parameter setting value (exclusion information) to the test case management unit 134.

In order to improve the search accuracy, the error condition search unit 1363 may not perform the search process until the number of test cases included in the error list reaches a predetermined fixed number. Further, the error condition search unit 1363 may search for parameter setting values common to all test cases included in the error list, or the error condition search unit 1363 may search for parameter setting values common to at least some test cases included in the error list.

The test case management unit 134 excludes test cases including common parameter setting values from the test execution targets (step S10). To be specific, the test case management unit 134 performs processing such as excluding the relevant test case from the test case execution order list or setting a non-execution flag.

Next, the test control unit 131 confirms whether or not all the test cases have been executed (step S11). When it is not confirmed that all the test cases have been executed (NO in step S11), the test control unit 131 returns to step S5 and continues the process. When it is confirmed that all the test cases have been executed (YES in step S11), the test control unit 131 ends the test.

As described above, in the mobile terminal test device 1 according to the present embodiment, the error condition identification unit 136 identifies the parameter condition in which the communication error occurs from the set of the test cases in which the communication error has occurred among the test cases executed, and the test case management unit 134 excludes the unexecuted test cases that meet the identified parameter conditions from the subsequent execution targets. By this configuration, it possible to avoid the execution of test cases which are surely expected to cause communication errors, thereby making it possible to execute test cases efficiently and at low cost, even if the test includes a huge number of test cases, for example, a test of a mobile communication terminal supporting 5G NR.

Further, in the mobile terminal test device 1 according to the present embodiment, the error condition identification unit 136 is provided with an error determination unit 1361 that determines whether or not a communication error has occurred by comparing the reception level at the time of executing the test case with a predetermined reference value. By this configuration, the mobile terminal test device 1 according to the present embodiment can reliably determine the communication error of the test case, in addition to the success/failure of the test case.

Further, in the mobile terminal test device 1 according to the present embodiment, the error condition specifying unit 136 is provided with an error condition search unit 1363 that searches a parameter setting value common to each test case as a parameter condition in which a communication error occurs from a set of test cases in which a communication error has occurred. By this configuration, the mobile terminal test device 1 according to the present embodiment can quickly and surely acquire the parameter condition in which a communication error occurs.

Further, the mobile terminal test device 1 according to the present embodiment is provided with a capability information extraction unit 142 that extracts the first capability information related to the 5G NR wireless communication method and the second capability information related to the LTE wireless communication method from the terminal capability information. The test case generation unit 144 generates a test case as a combination of the parameter setting values set in the test parameters in the 5G NR wireless communication method and the test parameters in the LTE wireless communication method based on the first capability information and the second capability information. By this configuration, the mobile terminal test device 1 according to the present embodiment can reliably and easily generate all test cases without omission for various tests in an operation mode (non-standalone) in which a 5G NR wireless communication method and an LTE wireless communication method are used in combination.

Further, in the mobile terminal test device 1 according to the present embodiment, the test case generation unit 144 generates a test case as a combination of parameter setting values set as test parameters in the 5G NR wireless communication method based on the first capability information. By this configuration, the mobile terminal test device 1 according to the present embodiment can reliably and easily generate all test cases without omission for various tests, even in an operation mode (stand-alone) in which control and data transmission/reception between the base station and the mobile communication terminal are performed by the 5G NR wireless communication method alone.

As described above, the present invention has an effect that even a test of a mobile communication terminal corresponding to 5G NR, which has a huge number of test cases, can be carried out efficiently and at low cost, and is useful for mobile terminal test devices and mobile terminal test methods in general.

EXPLANATION OF REFERENCE NUMERALS

1, Mobile Terminal Test Device
2. Mobile Communication Terminal (Test Target)
11 Operation Unit
12 Display Unit
13 Control Unit
   131 Test Control Unit
   132 Execution Unit
   133 Result Acquisition Unit
   134 Test Case Management Unit
   135 Transmission Information Generation Unit
   136 Error Condition Specification Unit
      1361 Error Determination Unit
      1362 Error Case Storage Unit
      1363 Error Condition Search Unit
14 Processing Unit
   141 Terminal Capability Information Acquisition Unit (Acquisition Unit)
   142 Capability Information Extraction Unit (Extraction Unit)
   144 Test Case Generation Unit (Generation Unit)
   145 Test Case Execution Order List Generation Unit (List Generation Unit)
15 Base Station Simulator
   151 First Pseudo Base Station Unit
   152 Second Pseudo Base Station Unit
16 Storage Unit
210-1, 210-2 Combination of Parameter Setting Values (5G NR)
220-1, 220-2 Combination of Parameter Setting Values (LTE)
230 Combination of Parameter Setting Values (5G NR, LTE)
240, 310 Test Case
320 Test Case Execution Order List
330 Identification Number 340 Test Case Execution Result
350 Graph of Throughput
360 Evaluation of Throughput
370 Execution Schedule Check Box

What is claimed is:

1. A mobile terminal test device that tests a mobile communication terminal by simulating a mobile communication base station, the mobile terminal test device comprising:
   an acquisition unit that acquires terminal capability information, which is information related to a capability of the mobile communication terminal, by communicating with the mobile communication terminal;
   a generation unit that generates a test case as a combination of parameter setting values set in test parameters based on the terminal capability information;
   an execution unit that sequentially executes the test cases;
   an identification unit that identifies a parameter condition in which an error occurs, from a set of test cases in which the error occurred among the executed test cases; and
   a management unit that excludes unexecuted test cases that meet the identified parameter condition from subsequent execution targets.

2. The mobile terminal test device according to claim 1, wherein
   the identification unit is provided with a determination unit that determines whether or not the error has occurred, based on a reception level or a transmission level of the mobile communication terminal at the time of executing the test case.

3. The mobile terminal test device according to claim 1, wherein
   the identification unit is further provided with a search unit that searches a common parameter setting value from a set of test cases in which the error has occurred, as the parameter condition.

4. The mobile terminal test device according to claim 2, wherein
   the identification unit is further provided with a search unit that searches a common parameter setting value from a set of test cases in which the error has occurred, as the parameter condition.

5. The mobile terminal test device according to claim 1, further provided with an extraction unit that extracts a first capability information related to a first wireless communication method from the terminal capability information, wherein
   the generation unit generates a test case as a combination of parameter setting values set in the test parameters in the first wireless communication method based on the first capability information.

6. The mobile terminal test device according to claim 2, further provided with an extraction unit that extracts a first capability information related to a first wireless communication method from the terminal capability information, wherein
   the generation unit generates a test case as a combination of parameter setting values set in the test parameters in the first wireless communication method based on the first capability information.

7. The mobile terminal test device according to claim 3, further provided with an extraction unit that extracts a first capability information related to a first wireless communication method from the terminal capability information, wherein
   the generation unit generates a test case as a combination of parameter setting values set in the test parameters in the first wireless communication method based on the first capability information.

8. The mobile terminal test device according to claim 5, wherein
   the extraction unit further extracts a second capability information related to a second wireless communication method from the terminal capability information,
   the generation unit further generates a test case as a combination with the combination of parameter setting values set in the test parameters in the second wireless communication method, based on a combination of the parameter setting values set in the test parameters in the first wireless communication method and the second capability information.

9. The mobile terminal test device according to claim 1, further provided with
   a list generation unit that generates a list of execution order of the test cases generated by the generation unit, and
   a display unit that displays the list together with execution results of the test cases and presence/absence of execution exclusion.

10. The mobile terminal test device according to claim 5, wherein
    the first wireless communication method is a 5G NR (New Radio) communication method, and the second wireless communication method is a LTE (Long Term Evolution) or LTE-A (Long Term Evolution Advanced) communication method.

11. A mobile terminal test method that tests a mobile communication terminal by simulating a mobile communication base station, the method comprising:
    an acquisition step to acquire a terminal capability information, which is information related to a capability of the mobile communication terminal, by communicating with the mobile communication terminal;
    a generation step to generate a test case as a combination of parameter setting values set in test parameters based on the terminal capability information;
    an execution step to sequentially execute the test cases;
    an identification step to identify a parameter condition in which an error occurs, from a set of test cases in which the error occurred among the executed test cases; and
    a management step to exclude unexecuted test cases that meet the identified parameter condition from subsequent execution targets.

* * * * *